United States Patent [19]

Ohoka

[11] Patent Number: 4,938,089
[45] Date of Patent: Jul. 3, 1990

[54] FORGED GEAR FOR A TRANSMISSION
[75] Inventor: Noboru Ohoka, Nagoya, Japan
[73] Assignee: Ohoka Forge Co Ltd., Japan
[21] Appl. No.: 301,344
[22] Filed: Jan. 25, 1989
[30] Foreign Application Priority Data Jan. 29, 1988 [JP] Japan .................. 63-20374

[51] Int. Cl.$^5$ .................. F16H 3/08; F16D 23/06
[52] U.S. Cl. .................. 74/339; 192/53 F
[58] Field of Search .................. 74/339; 192/53 F, 108

[56] References Cited

U.S. PATENT DOCUMENTS

| | | | |
|---|---|---|---|
| 3,480,122 | 11/1969 | Ball et al. | 74/339 X |
| 3,548,983 | 12/1970 | Hiraiwa | 192/53 F |
| 3,550,738 | 12/1970 | Halibrand | 192/108 X |
| 3,749,215 | 7/1973 | Rommelshausen | 192/53 F |
| 4,008,624 | 2/1977 | Van Dest | 74/339 |
| 4,059,026 | 11/1977 | Stritzer | 192/108 X |
| 4,376,475 | 3/1983 | Janiszewski | 74/339 X |
| 4,687,081 | 8/1987 | Osterloff et al. | 192/53 F |

FOREIGN PATENT DOCUMENTS

| | | | |
|---|---|---|---|
| 1425835 | 9/1969 | Fed. Rep. of Germany | 74/339 |
| 2722103 | 12/1977 | Fed. Rep. of Germany | 74/339 |
| 2855542 | 6/1980 | Fed. Rep. of Germany | 192/108 |

*Primary Examiner*—Jose V. Chen
*Attorney, Agent, or Firm*—Fred Philpitt

[57] ABSTRACT

A forged gear for a transmission used in a motorcar, an agricultural machine, a construction machine or other industrial machine includes a gear body with spiral teeth and a dog member with dogs which is formed integrally with the gear body. Each dog has a body with a width which becomes greater in an axial direction of the gear and one end portion which is tapered in the same direction. Each dog projects both radially from an outer circumference of an annular portion of the dog member and axially from an inner side of one surface of an annular portion of the gear body. Only the spiral teeth of the gear body are formed and finished by machining, and all the other configurations and details of the gear, including the dogs of the dog member, are formed and finished only by forging a raw gear material. According to the preferred embodiment the foregoing inner side of one surface of the annular portion of the gear body is recessed as compared with an outer side of the same surface thereof.

1 Claim, 3 Drawing Sheets

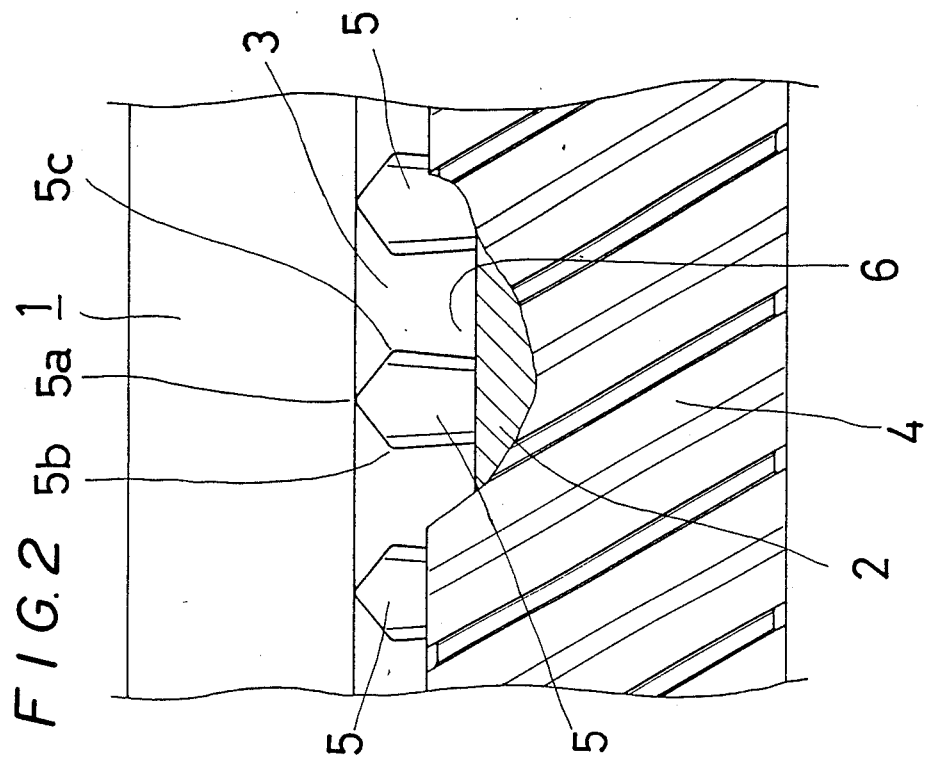
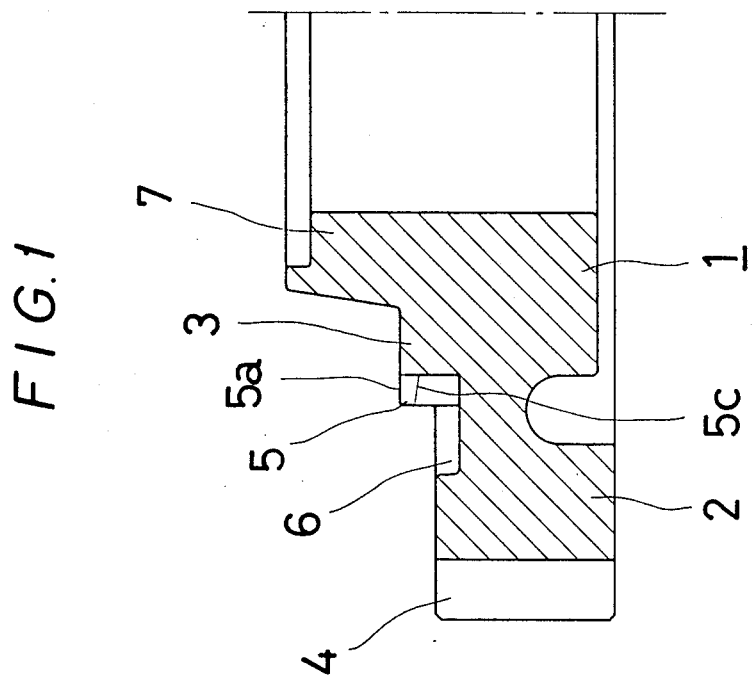

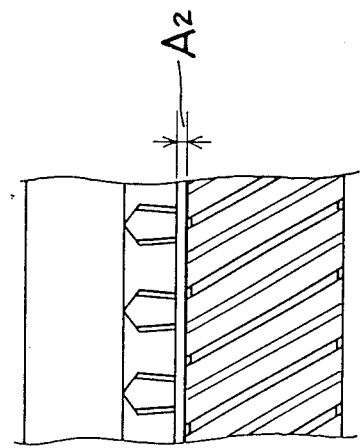
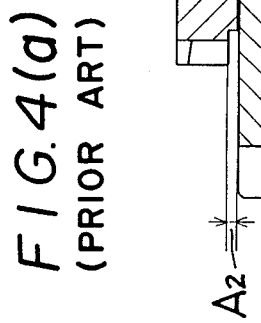
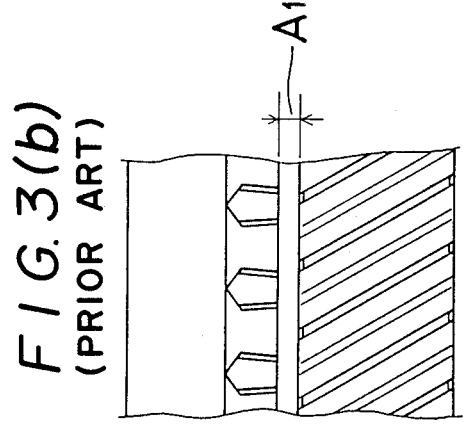
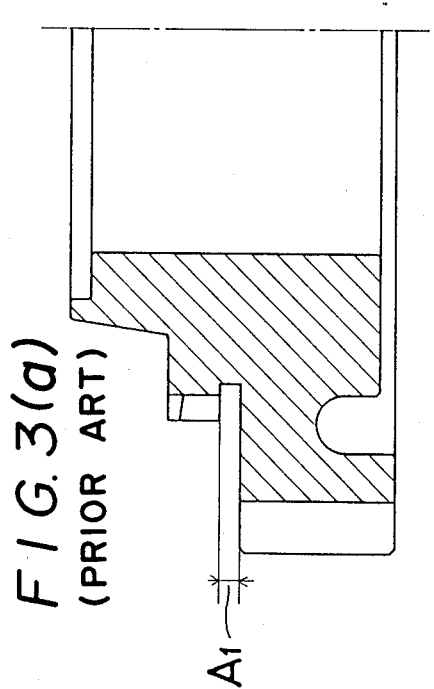
FIG.4(a) (PRIOR ART)
FIG.4(b) (PRIOR ART)
FIG.3(a) (PRIOR ART)
FIG.3(b) (PRIOR ART)

FORGED GEAR FOR A TRANSMISSION

FIELD OF THE INVENTION

This invention relates to forged gears for a transmission used in a motorcar, an agricultural machine, a construction machine or other industrial machine.

BACKGROUND OF THE INVENTION

Three different types of conventional forged gears for a transmission used in a motorcar, an agricultural machine, a construction machine or other industrial machine are illustrated in FIGS. 3(a) to 5(b). Each of the three types of the conventional forged gears is described below.

[1] First type of conventional forged gear:

FIGS. 3(a) and 3(b) show a first type of such conventional forged gear. This forged gear is produced by (i) forging a single gear material to form a gear body and a dog member and (ii) machining the gear body and the dog member to form spiral teeth for the former and dogs for the latter. As shown in FIG. 3(b), each dog of the dog member is so formed as to have a width which becomes greater in an upward direction (in FIGS. 3(a) and 3(b)), except for its upper portion which is tapered in the same direction. Also, there is a clearance $A_1$ between the dogs and one surface of the gear body. This clearance is produced, when the gear material is forged, as a space which will make it possible for the cutting tool to completely cut the lower portions (as viewed in FIGS. 3(a) and 3(b)) of the grooves to provide the dogs.

[2] Second type of conventional forged gear:

FIGS. 4(a) and 4(b) show a second type of the foregoing conventional forged gear. This forged gear is produced by (i) forging two separate gear materials into a gear body and a dog member, respectively, (ii) machining the gear body and the dog member to form spiral teeth for the former and dogs for the latter, and (iii) combining or joining the gear body and the dog member together by press fitting, welding or other suitable method.

As is the case with the first-type conventional gear of FIGS. 3(a) and 3(b), each dog of the dog member of the second-type conventional gear of FIGS. 4(a) and 4(b) is so formed as to have a width which becomes greater in an upward direction (in FIGS. 4(a) and 4(b)), except for its upper portion which is tapered in the same direction.

The gear body and the dog member combined together are subjected to heat treatment. The heat treatment may result in deforming the final product (gear). Thus, to prevent a deformation of it, the gear body and the dog member are produced such that the surfaces of the two entities to be brought into contact with each other (by combining the two entities together) will have relatively small areas. Also, there is a clearance $A_2$ between the dogs and one surface of the gear body. This clearance is produced, during the forging of the gear material for the dog member, as a space which will not allow downwardly-projecting burrs resulting from the cutting of the grooves to provide the dogs to touch the gear body or will allow such burrs to touch the gear body and bend thereon, when the gear body and the dog member are combined together. That is, the clearance $A_2$ makes it possible closely to combine the two entities together.

[3] Third type of conventional forged gear:

FIGS. 5(a) and 5(b) show a third type of the foregoing conventional forged gear. This forged gear is produced by (i) forging a single gear material to form a gear body and a dog member with half-finished dogs each having a particularly rough-finished lower portion (as viewed in FIGS. 5(a) and 5(b)), (ii) coining the whole in a cold process, and (iii) machining the gear body to form spiral teeth therefor, as well as machining the dog member to completely finish its dogs.

As illustrated, each dog of the dog member is so formed as to have a uniform width except for its tapered upper portion. Also, there is a clearance $A_3$ between the dogs and one surface of the gear body. This clearance is produced, during the forging of the gear material, as a space which will make it possible for the cutting tool to completely cut the lower portions (as viewed in FIGS. 5(a) and 5(b)) of the grooves to provide the dogs, when completely finishing the lower portions of the dogs.

Drawbacks of the first type of conventional forged gear:

However, the fact that the dogs of the dog member of the above-mentioned first type of conventional forged gear are formed by using a cutting tool leads to the following drawbacks of the gear:

A. It is possible that the top of the dog, or the top of the tapered upper portion of the dog, may not lie in the exact middle of the width of the entire dog.

B. It is possible that the top of the dog may be formed more or less flat.

C. It is possible that the dog may have appreciable burrs, particularly on the surface of its tapered upper portion, which is formed by chamfering.

The above-mentioned three drawbacks combine to prevent, for example, the driver of a motorcar with a transmission using the gears from performing gear-change very smoothly and comfortably.

D. As previously mentioned, the clearance $A_1$ is produced, when the gear material is forged, as a space which will make it possible for the cutting tool to completely cut the lower portions of the grooves to provide the dogs. However, since this clearance results in making longer the axial dimension of the entire gear, the clearance makes it impossible or very difficult to produce a compact and lightweight transmission. To be concrete, if the gear is an ordinary one used for a manual transmission for a motorcar, the clearance $A_1$ is usually set at approximately 3 millimeters. Thus, if the manual transmission is a five-speed transmission, the use of five gears of the first type each having the clearance $A_1$ will result in an approximate total clearance of as great as 15 millimeters and, hence, a compact manual transmission may not be produced. Also, if an impact is given to the gear in an axial direction thereof (i.e., in a vertical direction in FIGS. 3(a) and 3(b)) due to, for example, an undesirable or unsuitable gearchange, the presence of the clearance $A_1$ may cause the gear to be considerably damaged.

Drawbacks of the second type of conventional forged gear:

Also, the above-mentioned second type of conventional forged gear has the same drawbacks as the above-mentioned drawbacks A, B and C of the first type of conventional forged gear for the same reason as the first type of conventional gear. With regard to the above-mentioned drawback D, if the gear is an ordinary one used for a manual transmission for a motorcar, the clearance $A_2$ is usually set at at least approximately 1 millimeter. Thus, if the manual transmission is a five-speed transmission, the use of five gears of the second type each having the clearance $A_2$ will still result in a detectable amount of total clearance, namely, an approximate total clearance of at least 5 millimeters.

Additionally, if the gear body and the dog member are combined, or joined, together by press fitting or welding, the following drawback E or F will result:

E. If the gear body and the dog member are combined or joined together, by press fitting the dog member around the boss portion of the gear body (i.e., the portion thereof projecting vertically in FIG. 4(a), or in the axial direction of the gear), such that the inner surface of the dog member and the outer surface of the boss portion make a relatively large contact area, then the dog member may be liable to break. In contrast with this, if the press fitting of the dog member around the boss portion of the gear body is so made that the inner surface of the dog member and the outer surface of the boss portion make only a relatively small contact area, then it is possible that the dog member may be prone to removal from the gear body during the operation of the gear. Thus, if the gear body and the dog member are to be joined together by press fitting, special care must be taken, before forging gear materials, in selecting the optimum sizes of a dog member and of a boss portion of a gear body which will lead to the optimum press fitting of the dog member around the boss portion. Also, in such a case, careful attention must be given in selecting the pressure to be applied to the dog member for the press fitting thereof.

F. On the other hand, an attempt at welding the gear body and the dog member sometimes results in an incomplete joining of the two entities. Also, the two entities are subjected to thermal stress during welding, and the stress certainly results in changing the sizes of the two entities.

Drawbacks of the third type of conventional forged gear:

Although in a lesser degree than the foregoing first and second types, the foregoing third type of conventional forged gear also has the same drawbacks as the foregoing drawbacks A, B and C of the first type of conventional forged gear for the reason that a cutting tool is used to completely finish the dogs. Also, the clearance $A_3$ prevents a compact transmission from being produced. Moreover, since each dog of the dog member has a uniform width except for its tapered upper portion, it is possible that the dogs of the dog member may disengage from the dogs of a dog sleeve (not shown) when the gear is being used in a transmission.

SUMMARY OF THE INVENTION

It is an object of the invention to provide a forged gear for a transmission used in a motorcar, an agricultural machine, a construction machine or other industrial machine.

Another object of the invention is to provide a forged gear therefor which is produced by forging a single gear material to form and finish the greater part of a product, including a gear body and a dog member with dogs, and machining only the gear body to form spiral teeth thereof.

Still another object of the invention is to provide a forged gear capable of being used to manufacture a transmission for a motorcar which enables the driver to perform gear-change very smoothly and comfortably.

A further object of the invention is to provide a forged gear for a transmission used in a motorcar, an agricultural machine, a construction machine or other industrial machine, wherein dogs of a dog member project both radially from an annular portion of the member and axially from a surface of an annular portion of a gear body, and, hence, there is no clearance between the dogs and the surface of the annular portion of the gear body.

Still further object of the invention is to provide a forged gear therefor having a relatively small axial dimension.

Another object of the invention is to provide a compact and relatively lightweight forged gear therefor.

Still another object of the invention is to provide a forged gear which is suitable for the manufacture of a compact and relatively lightweight transmission for use in a motorcar, an agricultural machine, a construction machine or other industrial machine.

A further object of the invention is to provide a forged gear for a transmission used in a motorcar, an agricultural machine, a construction machine or other industrial machine, which can be produced with relative ease and at a low cost.

Other objects and advantages of the invention will become apparent upon reading a detailed description of the preferred embodiment of the invention.

BRIEF DESCRIPTION OF THE DRAWING

FIG. 1 is a cross section of half of a forged gear according to the invention. A vertical direction of FIG. 1 is the axial direction of the gear;

FIG. 2 is a partially cutaway, enlarged front view of an essential portion of the gear of FIG. 1;

FIGS. 3(a) and 3(b) are views similar to FIGS. 1 and 2, respectively, but showing a conventional type of forged gear;

FIGS. 4(a) and 4(b) are also views similar to FIGS. 1 and 2, respectively, but show a still another conventional type of forged gear;

DETAILED DESCRIPTION OF THE PREFERRED EMBODIMENT

Figure 5B:
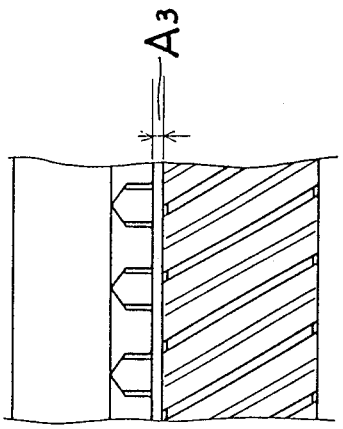
FIGS. 5(a) and 5(b) are also views similar to FIGS. 1 and 2, respectively, but show a further conventional type of forged gear.

FIGS. 1 and 2 illustrate a forged gear of the invention for a transmission used in a motorcar, an agricultural machine, a construction machine or other industrial machine. The gear is designated by numeral 1. Although it may be difficult to see it since FIG. 1 shows only half of the entire gear, the gear 1 is generally shaped into a ring. Thus, a vertical direction in FIG. 1 is the axial direction of the gear 1, and a horizontal direction therein is the radial direction of the gear. The other, right-hand half of the gear which is not shown has a shape corresponding to the shape of the illustrated left-hand half. The gear 1 includes (I) a gear body 2 which comprises an annular, inner portion and a plurality of spiral teeth 4 projecting radially from the outer circumference thereof and (II) a dog member 3 which comprises an annular, inner portion and a plurality of dogs 5 projecting radially from the upper portion of the outer circumference thereof.

Each dog 5 has (i) a body with a width which becomes greater in an upward direction (in FIGS. 1 and 2), or in the axial direction of the gear 1, and (ii) an upper portion which is tapered in the same direction. Numeral 5b designates a corner where the upper end of one side of the body of the dog 5 meets the lower end of one inclined surface of the tapered upper portion of the dog 5. Numeral 5c designates a corner where the upper end of the other side of the body of the dog 5 meets the lower end of the other inclined surface of the tapered upper portion of the dog 5. Not only both the corners 5b and 5c of the dog 5, but also its top 5a are not sharply edged, but slightly curved, or rounded, as illustrated.

As clearly illustrated particularly in FIG. 1, the upper surface of the annular portion of the gear body 2 has an inner recess 6. Thus, the upper surface of the annular portion of the gear body 2 may be considered to have a higher outer subsurface and an inner lower sub-surface which is formed by the recess 6. As mentioned above, the dogs 5 project radially from the upper portion of the outer circumference of the annular portion of the dog member 3. On the other hand, as clearly illustrated, the dogs 5 project axially, or in the upward direction (in FIGS. 1 and 2), from the above-mentioned inner lower sub-surface of the upper surface of the annular portion of the gear body 2.

The gear 1 also includes an innermost, annular boss portion 7 with an inner circumferential surface which defines a central circular opening of the gear 1.

The gear 1 of the invention is produced as follows:
(1) A single gear material is forged to form and finish all the structures, portions, configurations and details of a product (gear 1), including dogs 5, but excepting spiral teeth 4.
(2) Then, only the gear body 2 of the forged material is machined, by using a cutting tool, to form and finish spiral teeth 4. The gear 1 is thus produced.

The forging of the gear material is preferably performed in both of vertical and horizontal directions of the material.

The reason why the gear of the invention with no clearance between the dogs 5 and the upper surface of the annular portion of the gear body can be produced is that the dogs 5 are formed not by machining, but only by forging.

Comparison with the first type of conventional forged gear:

The comparison of the above-mentioned gear 1 of the invention with the previously-mentioned first type of conventional forged gear (of FIGS. 3(a) and 3(b)) reveals that the former is superior to the latter in the following respects:

I. The top of each dog 5, or the top of its tapered upper portion, lies in the exact middle of the width of the entire dog.

II. The top of the dog 5 is not formed flat, but is formed into a curved, or rounded corner.

III. Since the dogs 5 are formed and finished not by using a cutting tool, but by forging (the gear material), the surfaces of the dogs 5 are completely free from any burrs.

IV. The dog 5 has no clearance such as $A_1$ in the first conventional type between it and the upper surface of the annular portion of the gear body 2. To be more exact, far from having such a clearance, the dog 5 has its bottom in the recessed portion (, or in the inner lower sub-surface) of the gear body 2.

The above-mentioned merits I, II, III allow the driver to perform gear-change very smoothly and comfortably.

The above-mentioned merit IV enables the whole gear 1 to be produced with a relatively small axial dimension and, hence, a relatively light weight, thus enabling a compact and relatively lightweight transmission to be manufactured.

Also, the fact that the dogs 5 are formed not by machining, but by forging produces the feature that the flow lines of the entire dog member 3 run continuously along the external shape of the dog member. And this feature increases the mechanical strength of each dog 5 in the circumferential direction of the member 3 by 20 to 30 per cent in comparison with the mechanical strength of a conventional dog formed by machining.

Comparison with the second type of conventional forged gear:

The comparison of the gear 1 of the invention with the previously-mentioned second type of conventional forged gear (of FIGS. 4(a) and 4(b)) reveals that the former is also superior to the latter in the same respects as to the first conventional type. In addition, the gear is also superior to the second conventional type in the following respect:

V. Since the gear of the invention is formed of a single gear material, any parts, particularly the gear body and the dog member, of the gear need not be combined or joined together.

Such a merit V enables not only the entire process of producing the gear to be very much simplified, but also sound forged gears to be produced. In this connection, it is to be noted that the simplified process allows the whole cost of producing a forged gear for a transmission to be reduced by 30 per cent or more in comparison with a process of producing such a forged gear which includes joining a gear body and a dog member.

Figure 5A:
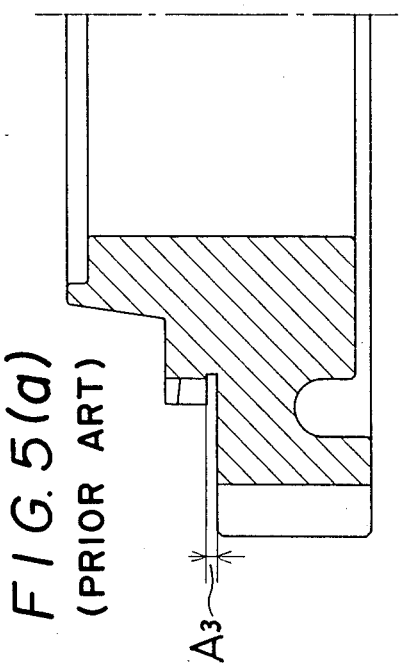
Figure 7:
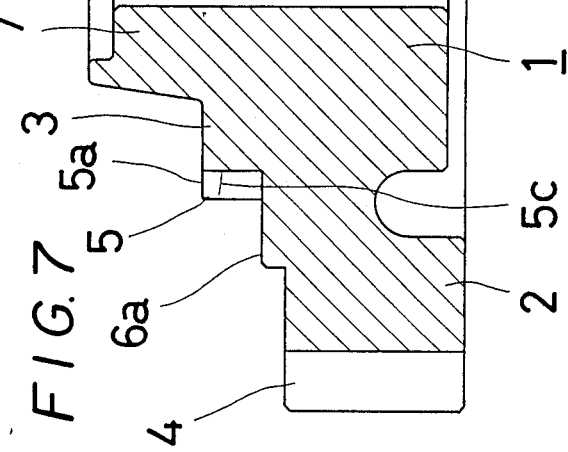
Figure 6:
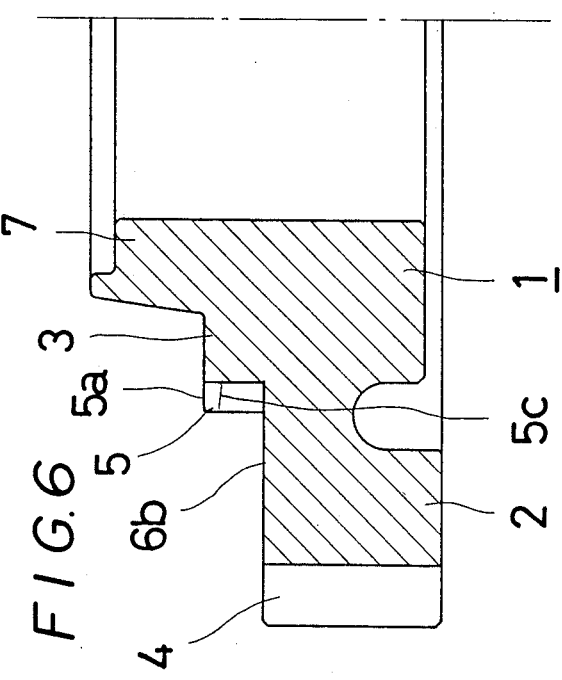

Comparison with the third type of conventional forged gear:

Although in a lesser degree than to the first and second conventional types, the gear 1 of the invention is still superior to the previously-mentioned third type of conventional forged gear (of FIGS. 5(a) and 5(b)) in the same respects as to the first conventional type. In addition, the gear 1 is also superior to the third conventional type in the following respect:

VI. The body of the dog 5 has a width which becomes greater in an upward direction (in FIGS. 1 and 2), or in the axial direction of the gear.

This merit VI does not allow the dogs 5 to disengage from the dogs of a dog sleeve (not shown) when the gear is being used in a transmission.

Additional merits: The gear 1 of the invention has a further advantage over the three conventional types because not only the top 5a of the dog 5, but also the two opposite corners 5b and 5c thereof are not sharply edged, but slightly curved or rounded. This merit, together with the foregoing merits I, II and III, allows the driver to perform gear-change very smoothly and comfortably.

Summary of the principal benefits: The principal benefits provided by the gear 1 of the invention may be summarized as follows:

(a) If the gears 1 are used for a transmission for a motorcar, the driver can perform gear-change very smoothly and comfortably.

(b) A compact, relatively lightweight and sound forged gear may be produced with relative ease and at a reduced cost.

(c) The above benefit (b) permits a lot of latitude in selecting a desired design of a transmission.

(d) A forged gear with dogs having a shape different from the illustrated shape may be produced merely by changing the die used for the forging of the gear material.

What is claimed is:

1. A gear for a transmission used in a motorcar, an agricultural machine, a construction machine or other industrial machine, which comprises
    (i) a gear body (2) with (a) spiral teeth (4) at the circumferences thereof and (b) an inner recessed portion (6) located inwardly of said spiral teeth (4), and
    (ii) a dog member (3) located in said recessed portion (6)
        the dog member (3) having a plurality of circumferential dogs (5) which project radially outwardly from an annular portion of the dog member (3) and axially outwardly from said recessed portion of the gear body (2),
        each of said circumferential dogs (5) comprising (a) a major portion which gradually becomes wider axially and (b) a substantially triangular top portion which project axially from the widest portion of said major portion,
        opposed sides of said major portion of each dog (5) meeting two inclined sides of said triangular top portion of the dog (5) at slightly rounded corners,
        the two inclined sides of the triangular top portion of each dog also meeting each other at a slightly rounded top corner,
        the gear body (2), the dog member (3) and the dogs (5) being integrally formed by forging a raw gear material and
    the spiral teeth (4) being formed by a machining operation.

* * * * *